United States Patent [19]

Beck

[11] Patent Number: 4,550,043

[45] Date of Patent: Oct. 29, 1985

[54] PREFORM WITH INTERNAL BARRIER AND INTERNAL LAYER OF HIGH THERMAL STABILITY AND PRODUCTS MADE FROM THE SAME

[75] Inventor: Martin H. Beck, Brookline, N.H.

[73] Assignee: Continental Plastic Containers, Inc., Stamford, Conn.

[21] Appl. No.: 581,148

[22] Filed: Feb. 17, 1984

[51] Int. Cl.$^4$ ............................................. B65D 23/00
[52] U.S. Cl. ..................................... 428/36; 428/412; 428/522; 215/1 C; 215/12 R; 220/415; 220/453; 220/468
[58] Field of Search ........................ 428/36, 412, 522; 215/1 C, 12 R; 220/415, 453, 468

[56] References Cited

U.S. PATENT DOCUMENTS

| | | | |
|---|---|---|---|
| 4,082,854 | 4/1978 | Yamada et al. | 428/522 |
| 4,398,642 | 8/1983 | Okudaira et al. | 428/480 |
| 4,399,179 | 8/1983 | Minami et al. | 428/480 |
| 4,439,493 | 3/1984 | Hein et al. | 428/522 |

FOREIGN PATENT DOCUMENTS 2091629  8/1982  United Kingdom .

*Primary Examiner*—Joseph L. Schofer
*Assistant Examiner*—N. Sarofim
*Attorney, Agent, or Firm*—Charles E. Brown

[57] ABSTRACT

This relates to providing a preform for use in blow molding containers which are suitable for use in conjunction with hot products which must be subjected to pasteurization. A preform is injection molded in stages and normally will have five layers including two interior barrier layers surrounding a central core. The core is to be formed of a thermoplastic having a high temperature thermal stability and is primarily selected from polycarbonates and acrylonitriles. This abstract forms no part of the specification of this application and is not to be construed as limiting the claims of the application.

20 Claims, 17 Drawing Figures

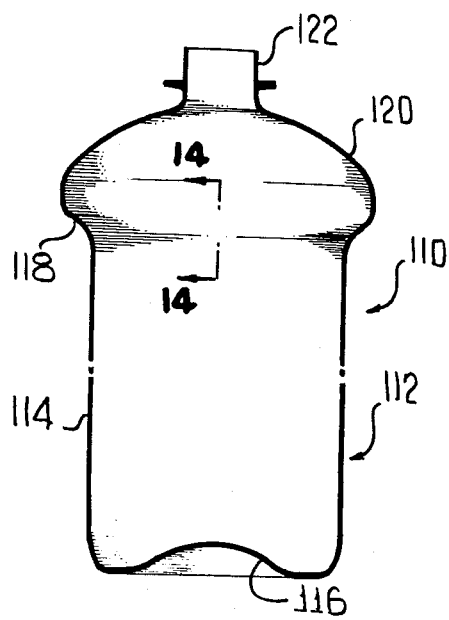
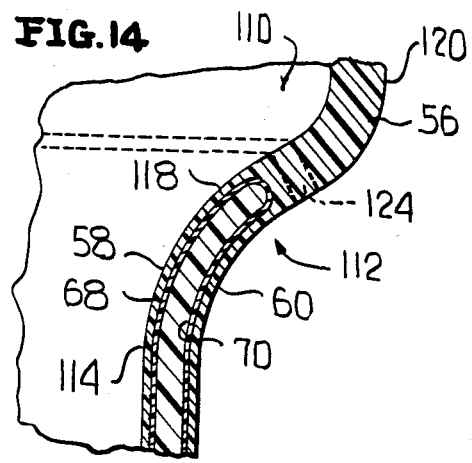
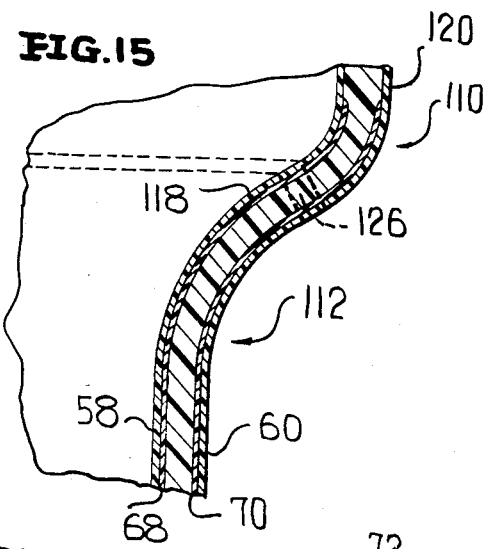
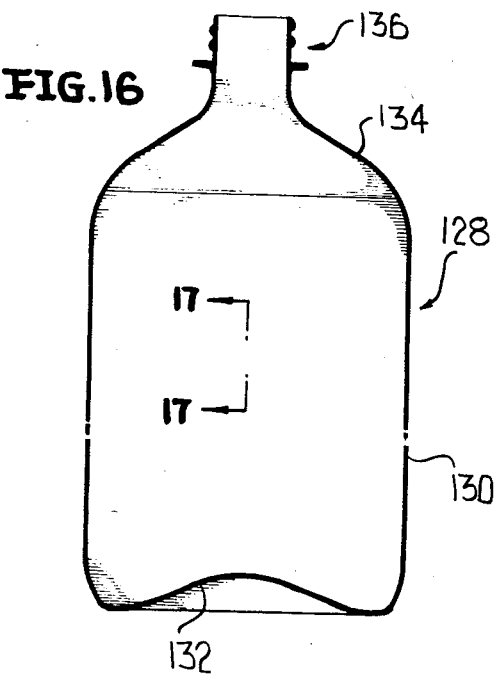
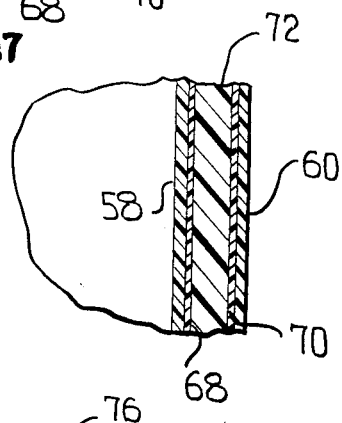
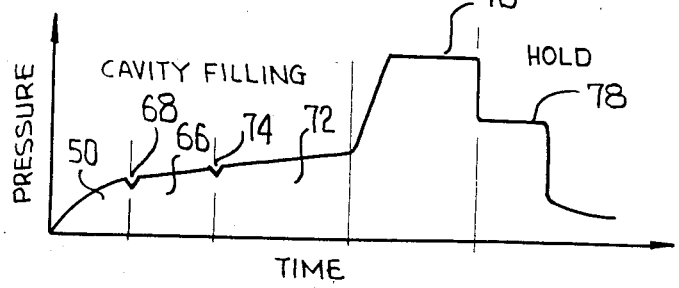

4,550,043

PREFORM WITH INTERNAL BARRIER AND INTERNAL LAYER OF HIGH THERMAL STABILITY AND PRODUCTS MADE FROM THE SAME

This invention relates in general to new and useful improvements in preforms formed by injection molding thermoplastic material and which preforms are utilized in the forming of blow molded articles.

There has been developed by others a five-layer preform wherein two intermediate layers are formed of a barrier material and with there being a fifth single internal layer. In accordance with this invention, in lieu of the fifth layer being formed of the same thermoplastic resin as two other layers, it is proposed beneficially to utilize as the fifth single layer a thermoplastic resin which has high temperature thermal stability.

The invention will be described in conjunction with the description of the preform, method of forming the preform, and the resultant blow molded articles devised by the other party.

There has been developed a method of forming a preform by injection molding wherein there is incorporated therein a central layer of barrier material. This is disclosed in U.K. patent application No. 2091629A. However, because of the cost of the barrier material, the thickness of the barrier layer which is possible in accordance with that patent application is too great to be commercially feasible.

With the above and other objects in view that will hereinafter appear, the nature of the invention will be more clearly understood by reference to the following detailed description, the appended claims, and the several views illustrated in the accompanying drawings.

IN THE DRAWINGS

FIG. 7 is another diagram plotting pressure within the mold cavity against time.

FIG. 13 is a vertical sectional view taken through an intermediate article of manufacture utilizing a preform such as that shown in FIGS. 11 and 12.

FIG. 14 is a fragmentary enlarged radial sectional view taken generally along the line 14—14 of FIG. 13, and shows the arrangement of the layers of material within the article.

FIG. 15 is an enlarged fragmentary sectional view similar to FIG. 14, and shows a different arrangement of the material layers.

FIG. 16 is a vertical sectional view taken through a bottle or like container formed utilizing one of the preforms of FIGS. 8-10.

FIG. 17 is an enlarged fragmentary radial sectional view taken generally along the line 17—17 of FIG. 16, and shows the relationship of layers of material in the finished bottle.

Figure 1:
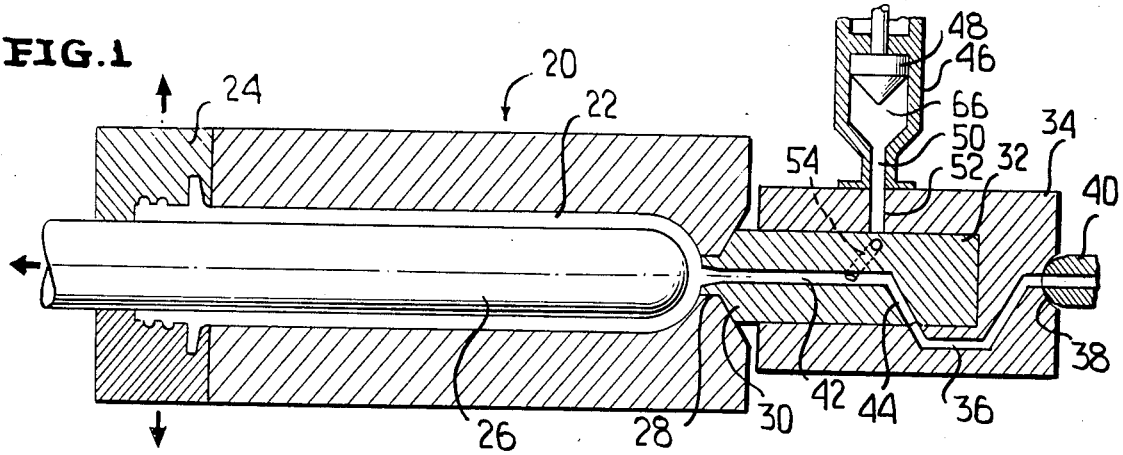
FIG. 1 is a schematic sectional view taken through one injection mold cavity, and shows the manner in which material is directed into the cavity to form a preform in accordance with this invention.

Referring now to the drawings in detail, it will be seen that there is illustrated in FIG. 1 a conventional injection mold generally identified by the numeral 20. It is to be understood that this is a schematic showing in that a conventional injection mold for forming a preform will include numerous cavities, for example sixteen or more, arranged in rows and columns. Such an injection mold is generally of a solid construction and each injection mold unit will include a mold cavity 22. Each mold unit 20 will also include a neck ring 24 which forms an extension of the mold cavity 22 and defines a neck finish. The neck ring 24 may be of a split construction. Further, each mold unit 20 is provided with a core 26.

It will be seen that the neck ring 24 in conjunction with the core 26 closes what may be considered to be the upper end of the mold cavity 22 while the lower end of the mold cavity is provided with an opening 28 which may receive in sealed relation the nozzle of an extruder.

In lieu of the nozzle of the extruder being directly received within the opening 28, a nozzle-like end 30 of a rotary valve member 32 is received in the opening 28 in sealed relation. The valve member 32 is mounted in sealed relation within a valve block 34 which has formed therein a first passage 36 which receives the conventional nozzle 40 of a plasticizer or injection head. The passage 36 opens radially toward the rotary valve member 32. The rotary valve member 32 has a through passage 42 which at one end terminates in a generally radial passage 44 which can be aligned with the passage 36. There is also associated with the valve block 34 a second material dispenser 46 which in its simplest form may include a dispensing piston 48 and which has a flow passage 50 exiting therefrom toward the valve block 34. The valve block 34 has a radial passage 52 which is axially aligned with and in communication with the passage 50. The passage 52 terminates at the valve member 32. The valve member 32 has a further passage 54 extending generally radially from the passage 42 and so circumferentially spaced from the passage 44 such that when the passage 44 is aligned with the passage 36 the passage 54 is spaced from the passage 52 in a circumferential direction. By rotating the valve member 32, the passage 44 may be moved out of communication with the passage 36 and the passage 54 moved into communication with the passage 52.

In accordance with this invention there will be a second plasticizer (not shown) and the valve will be modified to selectively receive hot melt from either of the two plasticizers in the supply device 46.

The material delivered by the first of the plasticizers will be a suitable thermoplastic resin in the form of a hot melt. This resin may be such materials as PET, PP, PE, PVC and PC. The barrier material which is supplied by the supply device 46 may be of any conventional known barrier material including, for example, EVAL, EVOH, PVOH and the like, or such barrier materials as may be developed in the future.

With respect to the foregoing, it is to be noted that EVAL has barrier properties on the order of one hundred times that of PET; EVOH has barrier properties on the order of one hundred to two hundred times that of PET; and PVOH has barrier properties on the order of two thousand times that of PET. Accordingly, only a very thin layer of these barrier materials is required, and from a commercial standpoint it is highly desirable to maintain such very thin layers because of the much higher cost of the barrier materials than the acceptable thermoplastic resins including PET.

It is also to be understood that the external thermoplastic resin layers must be of sufficient thickness to protect the barrier layer. On the other hand, in the case of a bottle for beverages or other products containing $CO_2$, the innermost layer of the thermoplastic material, i.e. that which defines the interior of the container, must be relatively thin so as not to absorb $CO_2$.

The resin delivered by the second plasticizer, in accordance with this invention, will be different from the material delivered by the first plasticizer and will be a hot melt of a thermoplastic resin having high temperature thermal stability. Resins which at the present are commercially feasible from a cost standpoint include polycarbonates and acrylonitriles. The acrylonitriles may be a homopolymer but are preferably copolymers with a second monomer such as styrene, methylacrylate and methylmethacrylate.

Figure 2:
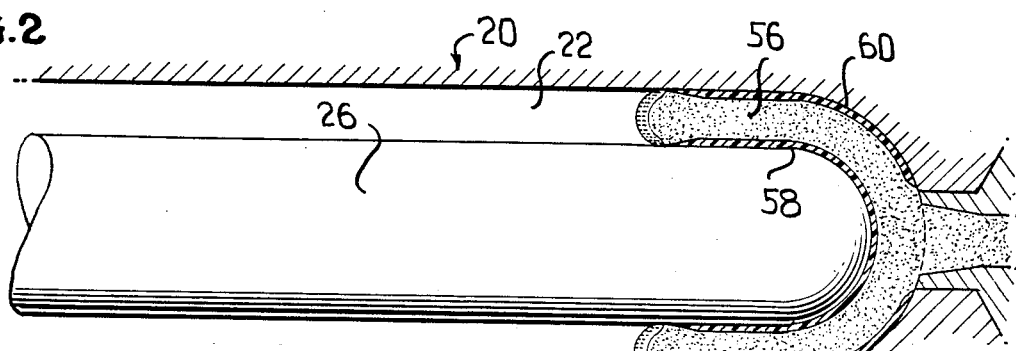
FIG. 2 is an enlarged fragmentary schematic view showing the manner in which a first quantity of thermoplastic resin is injected into the bottom of the mold cavity and the resultant cooling upon contact with cold wall surfaces.

Referring first to FIG. 2, it will be seen that a preselected limited amount of a first thermoplastic resin 56 will be injected into the bottom of the mold cavity 22 and as it flows through the mold cavity, due to the relatively cool temperature of the mold unit 20 including the core 26, there will be solidification of the thermoplastic resin 56 both externally and internally of the mold cavity 22 to define inner and outer layers 58, 60 of the first thermoplastic resin.

Figure 5:
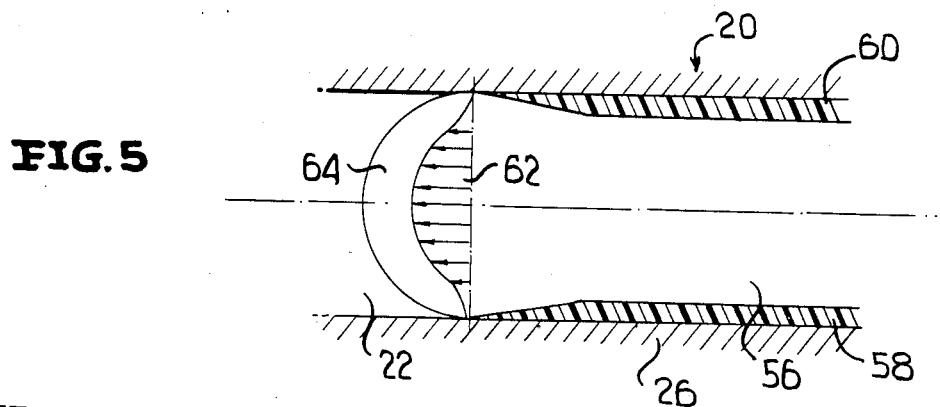
FIG. 5 is an enlarged fragmentary radial sectional view showing the flow of the thermoplastic material forming the first layers of the laminated preform.

Reference is particularly made to FIG. 5 at this time wherein it will be seen that the thermoplastic resin 56 has a laminar flow with the velocity of the advancing thermoplastic resin being the greatest in the center and diminishing toward zero adjacent the mold components. The velocity of the advancing thermoplastic resin 56 is generally indicated by an arrow schematic arrangement 62. It is to be understood that as the thermoplastic resin 56 solidifies upon contacting the mold components, the flow of the thermoplastic resin will discontinue adjacent the walls of the mold cavity 22 and there will be a tunnel flow effect between the layers 58, 60. Further, due to the relatively cool air within the mold cavity 22, there will be a slight cooling of the advancing front of the thermoplastic resin 56, which front is identified by the numeral 64.

It is to be understood that the thickness of the layers 56, 60 will be varied depending upon factors such as:
1. Material properties (viscoelastic and thermal)
2. Cavity dimensions
3. Injection velocity (pressure).

Figure 6:
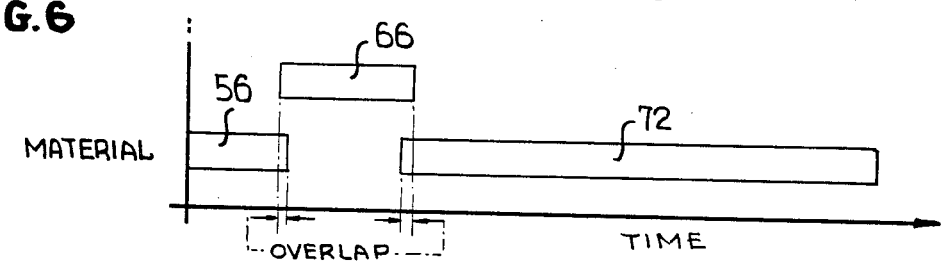
FIG. 6 is a diagram plotting the injection of the materials into the mold cavity against time.

It is to be understood that a precise amount of the first thermoplastic resin 56 will be injected into the mold cavity 22 over a selected period of time, with this being schematically shown in FIG. 6, and at a low pressure as indicated in FIG. 7. The quantity of the thermoplastic resin which is injected into the mold cavity may be controlled in many conventional manners. Basically, injection of the thermoplastic resin is effected by axially advancing the feed screw of a plasticizer, and a suitable stop may be provided to limit the advance of the feed screw. There also will be the timed rotation of the valve member 32 to move the passage 44 out of alignment with the passage 36 and thus the quantity of thermoplastic resin 56 injected into the mold cavity 22 may be controlled by the timing of the actuation of the valve member 32.

As is schematically shown in FIG. 6, the barrier material which is next injected into the mold cavity and is identified by the numeral 66, is fed toward the mold cavity in slightly overlapping relation with respect to the thermoplastic resin 56. It is to be understood that the mechanism for feeding the barrier material 66, as schematically shown in FIG. 1, may be of a single shot type so as to inject the exact amount of barrier material required.

With respect to FIG. 7, it will be seen that the barrier material 66 will be injected into the mold cavity 22 at a pressure only slightly higher than the pressure of the thermoplastic resin 56 with there being a very slight pressure drop as at 67 between the discontinuation of injecting the thermoplastic resin 56 and the initiation of the injection of the barrier material 66. The overlap in injection is to keep the pressure drop to a minimum.

Figure 3:
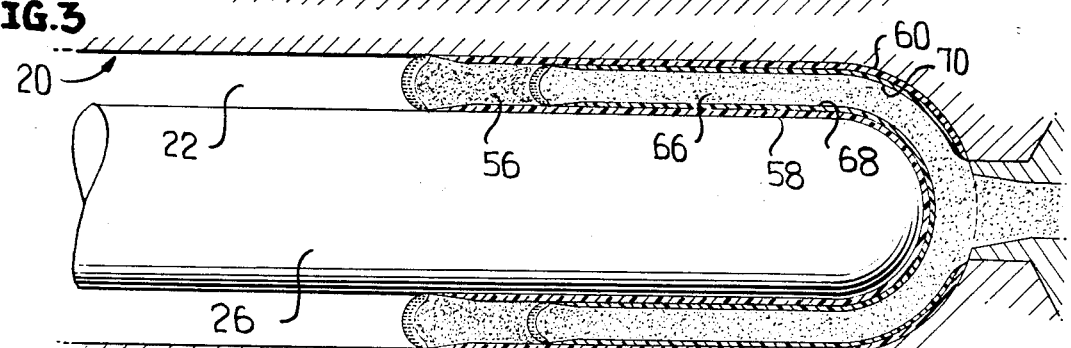
FIG. 3 is a schematic sectional view similar to FIG. 2, and shows the injection of a barrier material into the bottom of the mold cavity and the resultant tunnel flow of both the first quantity of thermoplastic resin and the barrier material.

Referring now to FIG. 3, it will be seen that the barrier material 66 will have a tunnel flow through the cavity defined between the layers 58, 60 and at the same time will advance the previously injected thermoplastic material 56. Normally the barrier material will have a lower melting temperature than the thermoplastic resin 56, and therefore the cooling effect of the thermoplastic resin layers 58, 60 on the barrier material 66 will not be as great as the mold surfaces on the thermoplastic material 56. Thus, while there will be solidification of the barrier material 66 as it contacts the solidified layers 58, 60 and there will be formed inner and outer solidified layers 68, 70 of the barrier material, these layers will be materially thinner than the layers 58, 60. For example, the layers 58, 60 will have a thickness varying from 0.010 to 0.040 inch. while the barrier material layers 68, 70 will have a thickness as low as 0.003 inch.

Figure 4:
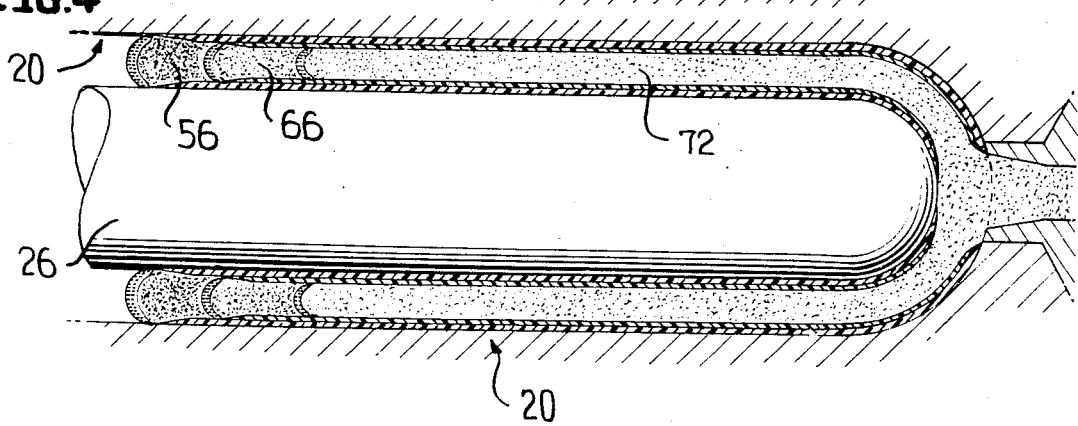
FIG. 4 is a schematic fragmentary sectional view similar to FIGS. 2 and 3, and shows the progressive flow of a second quantity of thermoplastic resin into and through the layers of the first thermoplastic resin and the barrier material.

Referring now to FIG. 4, the thermoplastic resin identified by the numeral 72 is injected into the mold cavity 22 from the second plasticizer to fill the cavity. The thermoplastic resin 72 will be a resin having a high temperature stability as described hereinbefore. The thermoplastic resin 72 as it advances within the confines of the layers 68, 70 of the barrier material will remelt the barrier material and advance it together with the barrier material melt 66 through the tunnel defined by the layers 68, 70, thereby reducing the thickness of the layers 68, 70. As will be apparent from FIG. 4, the advancing thermoplastic resin 72 will advance the barrier material 66 which, in turn, will continue to advance the thermoplastic resin 56.

Further with respect to FIG. 4, it will be seen that the advancing large quantity of the thermoplastic resin 72 as it engages the layers 58, 68 at the end of the core 26, will melt portions of the solidified layers 58, 68 and advance the same with the result that there may be no portion of either the layer 58 or the layer 68 at the extreme end of the core 26.

Referring next to FIG. 6, it will be seen that the thermoplastic resin 72 is advanced in slightly overlapping relation with the barrier material 66. It is to be understood that once the injection of the barrier material 66 has been completed the valve member 32 will be rotated to a position to receive the thermoplastic resin 72. In the illustrated embodiment, the valve member 32 will be returned to its starting position since the thermoplastic resin 72 is delivered from the same supply as the thermoplastic resin 56.

With respect to the diagram of FIG. 7, it will be seen that the thermoplastic resin 72 will be injected first at a gradually increasing pressure above the pressure of the injection of the barrier material 66 with a slight initial pressure drop, as indicated at 74. Then, when the cavity 22 has been filled, there will be a pressure boost, as at 76, followed by a holding period 78 wherein the pressure of the hot melt material injected into the mold cavity will gradually decrease as the thermoplastic material 72 gradually solidifies.

Depending upon usage of the preform which is formed in the manner described above, the amounts of the thermoplastic resin 56 and the barrier material 66 injected into the mold cavity 22 will vary. Further, the shape of the preform at the front end thereof will vary.

Figure 8:
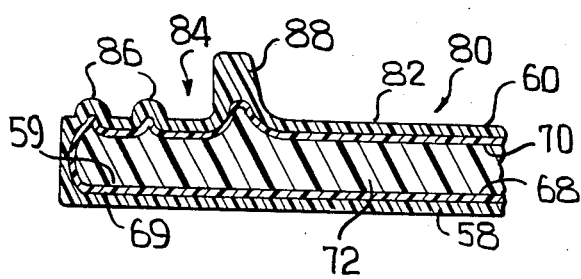
FIG. 8 is an enlarged radial sectional view through the neck finish end of a preform in accordance with this invention for forming a blow molded bottle, and shows one arrangement of material layers within the preform.
Figure 9:
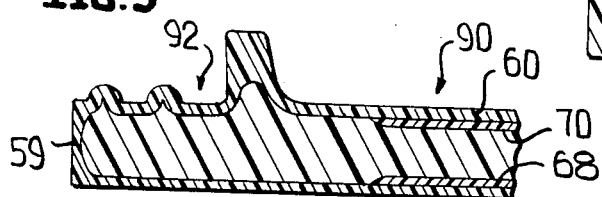
FIG. 9 is a fragmentary sectional view similar to FIG. 8, but showing another relationship of the material layers in the area of the neck finish.
Figure 10:
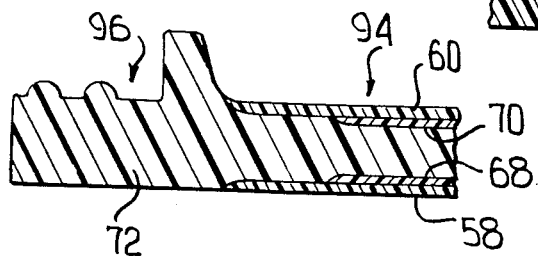
FIG. 10 is yet another enlarged fragmentary sectional view similar to FIG. 8, and shows yet another arrangement of the material layers within the preform.

In FIGS. 8, 9 and 10, there are illustrated preforms which are particularly adapted to be used in their entireties in the blow molding of bottles and like containers wherein a small diameter closure is applied by means of screw threads.

With respect to FIG. 8, the illustrated preform portion is part of a preform identified by the numeral 80 and includes a laminated body 82 which terminates in a neck finish generally identified by the numeral 84. The neck finish 84 includes injection molded threads 86 and a shoulder member 88 by means of which the preform 80 is supported during reheating and blow molding.

In the preform 80, the quantity of thermoplastic resin 56 injected into the mold cavity is sufficient to have the layers 58, 60 extend to the extreme end of the preform 80 and to form at the extreme end an end wall 59. Further, the quantity of barrier material injected into the mold cavity is sufficient to have the layers 68, 70 extend to a point adjacent the extreme end of the preform and to form an end wall 69 adjacent the end wall 59. Of course, the thermoplastic resin 72 will also extend to the extreme end of the preform 80 as permitted by the end wall 69.

In FIG. 9 there is illustrated a preform 90 which will be of the same configuration as the preform 80. Further, while the quantity of the thermoplastic resin 56 directed into the mold cavity will be sufficient for the layers 58, 60 to go to the extreme end of the preform including a neck finish portion 92 thereof and to form the end wall, the quantity of the barrier material 66 injected into the mold cavity will be such that the layers 68, 70 will terminate interiorly of the preform short of the neck finish 92 into that area of the resultant bottle which becomes the shoulder of the bottle, as will be described in detail hereinafter.

With respect to FIG. 10, the preform 94 thereof is also of an identical configuration to the preform 80. However, the quantity of the thermoplastic resin 56 introduced into the mold cavity will be only sufficient for the layers 58, 60 to extend to a point adjacent to the neck finish 96 of the preform 94. Thus, the neck finish part of the preform 94 will be formed solely by the thermoplastic resin 72. Further, the quantity of the barrier material 66 injected into the mold cavity will be such that the layers 68, 70 terminate internally of the preform short of the termination of the layers 58, 60.

Figure 11:
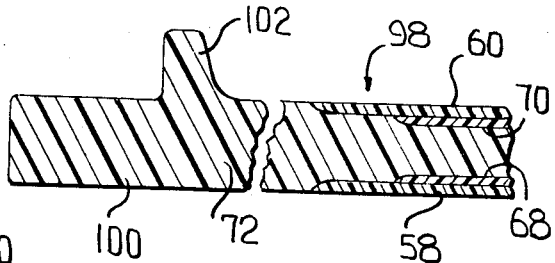
FIG. 11 is an enlarged fragmentary sectional view similar to FIG. 8, but through a slightly different type of preform, and shows the arrangement of the layers therein.
Figure 12:
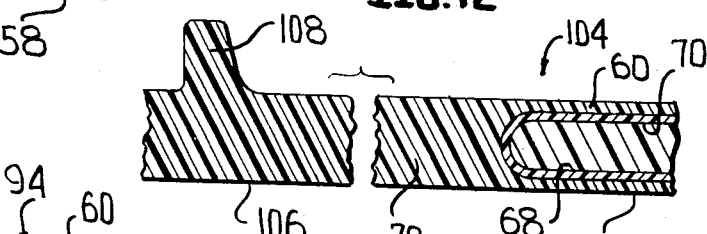
FIG. 12 is yet another enlarged fragmentary sectional view similar to FIG. 8, but with respect to a preform of the type shown in FIG. 11 and showing yet another arrangement of material layers.

In FIGS. 11 and 12 there are illustrated preforms for forming containers and like hollow articles other than bottles or containers with small diameter neck finishes. An extreme end portion only in radial section of such preform is illustrated in each of FIGS. 11 and 12.

With particular reference to FIG. 11, it will be seen that there is illustrated a preform 98 having an open end portion 100 which may include a supporting flange or collar 102. Inasmuch as the end portion 100, as will be described in detail hereinafter, is utilized solely as a support in the blow molding of the preform 98 into a tubular shape, it is not necessary that the barrier material 66 extend into the end portion 100. Therefore, only sufficient barrier material is injected into the mold cavity of the preform 98 so as to permit the layers 68,70 to terminate adjacent the end portion 100. In a like manner, the quantity of thermoplastic resin 56 injected into the mold cavity will be only sufficient to have the layers 58, 60 extend generally into the area of the end portion 100. Thus, the end portion 100 will be formed entirely by the thermoplastic resin 72.

In FIG. 12 there is illustrated yet another preform 104 which is identical to the preform 98 including an end portion 106 and a flange or collar 108, except that the end portion 106 is formed entirely by the thermoplastic resin 56 and the layers formed by the resins 66 and 72 terminate in relatively great spaced relation to the end portion 106. The preform 104 is advantageous in forming a container or like tubular body wherein an intermediate article of manufacture is involved.

Referring now to FIG. 13, it will be seen that there is illustrated an intermediate article of manufacture generally identified by the numeral 110 and blow molded from a preform such as the preform 98 or the preform 104. The intermediate article of manufacture includes a base portion 112 in the form of a container. The base portion 112 includes a tubular body 114 having an integral bottom 116 and terminating in a closure receiving portion 118. The illustrated closure receiving portion 118 is in the form of a flange adapted to be engated by a conventional metal end unit and forming part of a conventional double seam securing the metal end unit (not shown) to the base portion 112 which, when separated from the remainder of the intermediate article of manufacture 110, becomes a container.

Although it has not been so illustrated, the intermediate article of manufacture 110 may have the closure receiving portion 118 in the form of a neck finish which may be threaded or otherwise modified to receive a closure unit. At this time it is to be understood that except for the fact that it is formed from a laminated preform the intermediate article of manufacture 110 has been formed prior to this invention.

It will be seen that the intermediate article of manufacture also includes an upper blow molded portion 120 which terminates in an end portion 112 which will correspond to the end portions 100, 106 of the preforms 98, 104.

With respect to FIG. 14, the intermediate article of manufacture illustrated therein was formed from a preform such as the preform 104 of FIG. 12. It is to be understood that the upper portion 120 is to be separated from the base portion 112 by a cutting action, such as a fusion cutting action, with the removal of a portion 124. It will be seen that in this embodiment of the invention the layers 68, 70 terminate in the closure receiving portion 118 and that the layer formed by the thermoplastic material 72 terminates entirely within the base portion 112. Thus all of the intermediate article of manufacture 110 which is to be severed from the base portion 112 will be formed by the thermoplastic resin 56 and may be reconditioned and reused.

On the other hand, with respect to FIG. 15, there may be occasions where it is desired that the barrier material layers 68, 70 extend beyond the closure receiving portion 118 into the upper portion 120. Thus, when the base portion 112 is removed from the remainder of the intermediate article of manufacture 110, the layers 68, 70 of the barrier material will extend through the cut edge of the base portion 112 into the upper portion 120. In a like manner, the layers 58, 60 of the first thermoplastic resin will also extend into the upper portion 120. Thus, when the base portion 112 is severed from the remainder of the intermediate article of manufacture 110 by removal of the material in the area 126, the intermediate article of manufacture 110 illustrated in FIG. 15 may be formed, for example, from the preform of FIG. 11. When the cutting action involves heat fusion of the cut layers to one another this may be effected at the end of the base portion 120.

In FIG. 16 there is illustrated a conventional bottle which may be formed from any one of the preforms of FIGS. 8, 9 and 10. The bottle is generally identified by the numeral 128 and includes a tubular body 130 having an integral bottom 132. The body 130 at its upper end is connected by way of a shoulder 134 to a neck finish 136.

With particular reference to the bottle 128, it is to be understood that in the normal blow molding of such bottle the body portion 130 will be very thin, having been reduced in thickness on the order of one-tenth or less so that the material forming the body 130 will have a positive and desired biaxial orientation. On the other hand, the material of the bottle 128 in the shoulder 134 closely adjacent the neck finish 136 will have only a minor reduction in thickness while the material in the neck finish 136 will not be reduced in thickness at all. Thus, the barrier material 66 may beneficially terminate in the shoulder 134 as described above.

It is also pointed out here that the extreme center of the bottom 132 is of a much greater thickness than the body 130, and therefore the absence of barrier material in the central part of the bottom 132 will not be a material omission.

Reference is finally made to FIG. 17 which is a radial cross section of the body 130 and shows inner and outer layers 58, 60 of the first thermoplastic material 56, inner and outer layers 68, 70 of the barrier material 66, and a central core of the other thermoplastic material 72.

Inasmuch as there is a reduction in thickness of the laminated preform on the order of ten times, the thickness of the layers 58, 60 in the bottle 128 will be on the order of 0.001 to 0.004 inch, while the thickness of the barrier material layers 68, 70 will be on the order of 0.0003 inch. The thickness of the layer 58 will be sufficient to protect the barrier layer 68 against the contents of the bottle 128 including available $CO_2$.

Further, it has been found that when the barrier material 66 does not have properties which permit the heat bonding thereof to the thermoplastic resin and the thickness of the layers 68, 70 have been relatively great as required by known practices, when the blow molded article has been formed there has been a positive delamination of the layers of barrier material from the remainder of the blow molded article. However, when the barrier material layers in the preform are very thin, as described hereinabove, it has been found that the prior pronounced delamination does not occur. A conventional test for delamination is the squeezing of the body of a blow molded article, and if there is delamination there will be a squeaking noise emitted. When the barrier material layers are very thin at the start, the blow molded articles utilizing such a preform do not emit the squeaking noise and do not show evidence of a complete delamination.

It will be understood that by utilizing a thermoplastic resin having a high temperature thermal stability for the central core material, further beneficial results may be obtained over preforms formed of the same thermoplastic resin for both the inner and outer layers 58, 60 and the central core in that blow molded articles formed from such preforms will be shape maintaining at much higher temperature and may be used in packaging hot products as well as products such as beer which require pasteurization.

There has recently been developed by others a five-layer tubular parison which is formed as an extruded tube. Such parison does have a barrier layer which is thin, but which is not directly bonded to the thermoplastic resins which form the primary layers of the parison. The method of forming such a multi-layer parison is not conducive to the diffusion bonding of a barrier layer to a conventional thermoplastic resin layer by way of pressure when the materials of the two layers are not normally heat bondable together in that the components of such a tubular parison are extruded at a low pressure on the order of 2000 to 5000 p.s.i. and as soon as the tube leaves the extrusion head, at which time all components are hot, the pressure is relieved and as the components cool they shrink and tend to separate.

On the other hand, as is schematically shown in FIG. 7, when the various materials are introduced into the mold cavity 22 by a conventional injection molding process, the barrier layers 68, 70, in addition to being very thin and thus relatively incompressible, are clamped between the core 72 and the layers 58, 60 at a very high pressure on the order of 15,000 to 17,000 p.s.i. Therefore, while the barrier layers 68, 70 may not be heat bondable to the thermoplastic resin layers 58, 60 and the core 72, there is a considerable diffusion bonding effected between these layers at the high forming temperatures and pressures. Further, as is also shown in FIG. 7, after the injection step has been completed there is a maintaining of a pressure on the materials previously injected into the mold cavity and thus the pressure is maintained between the layers as the materials of the layers shrink, thereby preventing any tendency to separate due to relative shrinkage.

Since the thickness of the barrier layers 68, 70 may be as low as 0.003 inch, it will be apparent that it is of a relatively incompressible thinness. Further, as disclosed hereinbefore, the preform, at least in the body portion of the resultant blow molded hollow member, will be stretched on the order of ten times, thereby reducing the thickness of the barrier layers 68, 70 to be as low as 0.0003 inch, which thinness results in the resultant barrier layers as being extremely thin and thus incompressible for all practical purposes. The net result is that in the resultant blow molded hollow member the barrier layers 68, 70 maintain a pressure bond with the thermoplastic resin layers 58, 60 and the core 72.

Although only several preferred embodiments of the invention have been specifically illustrated and described herein, it is to be understood that material layers within the preforms may be varied in accordance with the desired uses of the preforms and the resultant blow molded articles.

I claim:

1. A laminated preform for forming blow molded articles and the like, said preform being injection molded and including a tubular wall having inner and outer surfaces, said tubular wall in radial cross section comprising inner and outer first layers of a thermoplastic resin, inner and outer layers of a barrier material next to and between said inner and outer first layers, and a second layer of thermoplastic resin between said barrier material layers, said second layer of thermoplastic material being a thermoplastic having high temperature thermal stability.

2. A laminated preform according to claim 1 wherein said second layer of thermoplastic material is a polycarbonate.

3. A laminated preform according to claim 1 wherein said second layer of thermoplastic material is an acrylonitrile.

4. A laminated preform according to claim 1 wherein said second layer of thermoplastic material is an acrylonitrile copolymer with a second monomer of the group including styrene, methyacrylate and methymethacrylate.

5. A laminated preform according to claim 1 wherein said second layer of thermoplastic material terminates between said barrier layers.

6. A laminated preform according to claim 1 wherein said second layer of thermoplastic material terminates beyond said barrier layers within said inner and outer first layers.

7. A laminated preform according to claim 1 wherein said preform has an open end portion, and said second layer of thermoplastic material extends beyond said barrier layers and said inner and outer first layer and forms said end portion.

8. An intermediate article of manufacture comprising a blow molded article including a base portion in the form of a container having a bottom portion, a body and an open mouth defined by a closure receiving upper portion, said blow molded article further including an upper neck portion, and an expanded upper portion joining said closure receiving upper portion to said upper neck portion, said base portion having a wall of a laminated construction and which in radial cross section includes inner and outer first layers of a thermoplastic resin, inner and outer layers of a barrier material within and next to said inner and outer first layers, and a further layer of thermoplastic resin between said layers of barrier material, and said barrier material layers terminating in said intermediate article of manufacture in the general area of said closure receiving upper portion, said further layer of thermoplastic material being a thermoplastic having high temperature stability.

9. An intermediate article of manufacture according to claim 8 wherein said further layer of thermoplastic resin is a polycarbonate.

10. An intermediate article of manufacture according to claim 8 wherein said further layer of thermoplastic resin is an acrylonitrile.

11. An intermediate article of manufacture according to claim 8 wherein said further layer of thermoplastic resin is an acrylonitrile copolymer with a second monomer of the group including styrene, methyacrylate and methymethacrylate.

12. An intermediate article of manufacture according to claim 8 wherein said barrier material layers and said further layer of thermoplastic resin terminate in said base portion.

13. An intermediate article of manufacture according to claim 8 wherein said further layer of thermoplastic resin extends beyond said barrier material layers and terminates in said expanded upper portion.

14. A container formed by blow molding and including a bottom, a body, and said body terminating in a neck finish, at least said body being of a laminated construction and in radial cross section includes inner and outer first layers of a thermoplastic resin, inner and outer layers of a barrier material within the next to said inner and outer first layers, and a further layer of thermoplastic resin between said layers of barrier material, said further layer of thermoplastic material being a thermoplastic having high temperature stability.

15. A blow molded container according to claim 14 wherein said further layer of thermoplastic resin is a polycarbonate.

16. A blow molded container according to claim 14 wherein said further layer of thermoplastic resin is an acrylonitrile.

17. An intermediate article of manufacture according to claim 8 wherein said further layer of thermoplastic resin is a polycarbonate copolymer with a second monomer of the group including styrene, methyacrylate and methymethacrylate.

18. A blow molded container according to claim 14 wherein said further layer of thermoplastic resin forms said neck finish.

19. A blow molded container according to claim 14 wherein said further layer of thermoplastic resin extends into said neck finish and terminates within said barrier layers.

20. A blow molded container according to claim 14 wherein said further layer of thermoplastic resin extends into said neck finish beyond said barrier layers and terminates within said inner and outer first layers.

* * * * *